United States Patent [19]

Otsuka et al.

[11] 4,422,724
[45] Dec. 27, 1983

[54] REAR VIEW MIRROR ARRANGEMENT TO BE MOUNTED ON A VEHICLE DOOR

[75] Inventors: Hidehiro Otsuka, Tokyo; Takaaki Oda; Fumiyoshi Sato, both of Machida; Masaaki Kikuta, Sayama, all of Japan

[73] Assignee: Nissan Motor Co., Ltd., Yokohama, Japan

[21] Appl. No.: 483,848

[22] Filed: Apr. 14, 1983

Related U.S. Application Data

[63] Continuation of Ser. No. 240,196, Mar. 3, 1981, abandoned.

[30] Foreign Application Priority Data

Mar. 5, 1980 [JP] Japan .................................. 55-26730

[51] Int. Cl.³ ............................ G02B 7/18; B60R 1/06
[52] U.S. Cl. ................................. 350/307; 248/475 B
[58] Field of Search ................... 350/307; 248/475 B, 248/484

[56] References Cited

U.S. PATENT DOCUMENTS 2,962,933 12/1960 Hezler, Jr. .
4,031,771 6/1977 Daly et al. ......................... 248/479

FOREIGN PATENT DOCUMENTS 217147 1/1957 Australia .
1826009 12/1960 Fed. Rep. of Germany .
2258296 6/1973 Fed. Rep. of Germany .
2202286 7/1973 Fed. Rep. of Germany ... 248/475 B
2436339 2/1976 Fed. Rep. of Germany .
2721004 11/1978 Fed. Rep. of Germany ...... 350/307
2829492 1/1980 Fed. Rep. of Germany ...... 350/307
2186905 1/1974 France .
2311690 12/1976 France .
1384845 2/1975 United Kingdom .

*Primary Examiner*—Jon W. Henry
*Attorney, Agent, or Firm*—Thompson, Birch, Gauthier & Samuels

[57] ABSTRACT

A rear view mirror arrangement including a mirror housing mounted on the vehicle side door with face to face contact. The mirror housing is retained in a position laterally protruding from the vehicle side door by spring force provided by a spring positioned between the mirror housing and the vehicle side door. The spring force permits the mirror housing to temporarily displace from the vehicle side door in response to an impact applied to the mirror housing in order to absorb the impact. The mirror arrangement has a mirror angle adjustment lever capable of adjusting the mirror angle in both vertical and horizontal directions. The mirror angle adjustment lever is releasably connected to the mirror permitting the displacement of the mirror housing with respect to the vehicle side door when the impact is received by the mirror housing.

16 Claims, 11 Drawing Figures

REAR VIEW MIRROR ARRANGEMENT TO BE MOUNTED ON A VEHICLE DOOR

This is a continuation of application Ser. No. 240,196, filed Mar. 3, 1981 now abandoned.

BACKGROUND OF THE INVENTION

The present invention relates generally to an external rear view mirror arrangement mounted on a side door of an automotive vehicle. More specifically, the invention relates to an improvement in relation to a rear view mirror foldable in relation to the vehicle side door responsive to an impact applied to a mirror housing.

There have been known various constructions of rear view mirror arrangements mounted of the vehicle side doors for viewing rear side view of the vehicles. Some of the conventional rear view mirror arrangements have been provided with safety structures for folding the mirror assemblies upon their being subjected to accidental impacts. One such rear view mirror arrangement has been disclosed in the German Pat. No. 20 37 101 to Daimler-Bentz AG in which has been shown an external rear-view vehicle mirror which has a hinge attached to a vehicle for foldably mounting a housing of the mirror onto the vehicle side door. The rear-view mirror is mounted within the housing by means of a mirror support. A lever connected to the mirror support adjusts the mirror angle in relation to the housing about axes defined at right angles to each other. The lever is projected into the vehicle compartment so that it can be operated from the inside of the vehicle compartment for adjustment of the mirror direction. The lever is connected with the mirror support through an operating mechanism having a pivot axis. The mirror housing is foldable about the hinge axis in relation to the vehicle door in response to an impact from the front or rear thereof.

In consideration of safety upon an accident, it is preferable to fold the mirror housing in the direction corresponding the direction of the impact. In this regard, the conventional external rear-view vehicle mirror presents a problem in that the mirror housing may not be folded in response to an impact applied vertically thereto. Furthermore, the conventional mirror has a complex lever mechanism for making the mirror housing foldable against substantially horizontal impact and for operation of the mirror support for the purpose of adjustment of mirror angle. This requires complicated structures and increased production costs.

SUMMARY OF THE INVENTION

Therefore, it is an object of the present invention to provide a rear view mirror arrangement which is mounted on the vehicle side door and is foldable in any direction corresponding to the direction of impact and has a relatively simple construction in relation to the conventional arrangement.

To accomplish the above-mentioned and other objects, there is provided a rear view mirror arrangement, according to the present invention, comprising a mirror housing mounted on the vehicle side door with face to face contact. The mirror housing is retained in a position laterally protruding from the vehicle side door by a spring force provided by a spring interpositioned between the mirror housing and the vehicle side door. The spring force permits the mirror housing to displace from the vehicle side door in response to an impact applied to the mirror housing in order to absorb the impact. The mirror arrangement has a mirror angle adjustment lever capable of adjusting the mirror angle in both vertical and horizontal directions. The mirror angle adjustment lever is non-rigidly connected with the mirror so that it permits the displacement of the mirror housing with respect to the support surface of the vehicle side door upon the impact being applied to the mirror housing.

According to one embodiment of the invention, there is provided a rear view mirror arrangement for an automotive vehicle, which is mounted on the vehicle side door, comprising a mirror, a mirror housing having a first pivot means for pivotably supporting the mirror within the housing a mirror angle adjustment lever having an operation handle at the inner end thereof, which handle is placed inside of a vehicle compartment, lever outer end cooperatively and releasably connected with the mirror, a second pivot means provided on the intermediate portion of the adjustment lever for permitting the adjustment lever to move in any direction and a spring provided between the mirror housing and the vehicle side door for elastically urging the mirror housing to return to its original laterally protruded position.

According to the invention, there is provided a method for mounting a rear view mirror onto a side door of an automotive vehicle comprising forming a support surface on the vehicle side door for mounting a mirror housing thereon, mounting the mirror housing onto the support surface with face to face contact, urging the mirror housing onto the support surface so that the mirror housing can be retained in a position laterally protruding from the support surface of the vehicle side door, releasably connecting a mirror angle adjustment lever to a reflecting mirror so that the mirror angle adjustment lever protrudes into the interior of a vehicle compartment at the inner end thereof for mirror angle adjustment operation within the vehicle compartment, and securing the mirror angle adjustment lever onto the vehicle side door in a position that the mirror angle adjustment lever can be moved in any direction, whereby said mirror housing can be retained on the support surface formed on the vehicle side door in the normal position and displaced from said support surface in response to an impact applied to said mirror housing from any direction in order to absorb the impact.

BRIEF DESCRIPTION OF THE DRAWINGS

The present invention will become fully understood from the detailed description given hereinbelow and from the accompanying drawings of the preferred embodiment of the present invention, which, however, should no be taken as limitative to the present invention but for elucidation and explanation only.

In the drawings

DESCRIPTION OF THE PREFERRED EMBODIMENT

Figure 1:
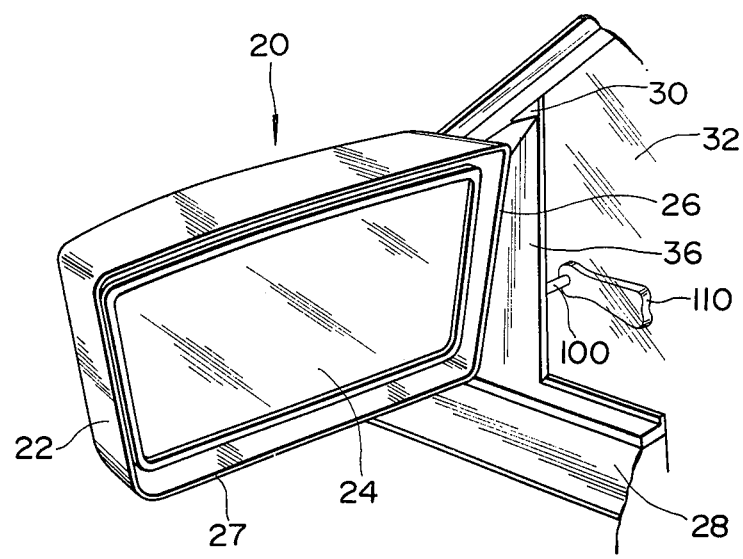
FIG. 1 is a perspective view of a preferred embodiment of a rear view mirror arrangement according to the present invention.

Referring now to the drawings particularly to FIGS. 1 to 6, there is illustrated a preferred embodiment of a rear view mirror arrangement in accordance with the present invention. The rear view mirror 20 generally comprises a plastic mirror housing 22 and a reflecting mirror 24. The mirror housing 22 has a substantially box-shaped configuration having a rear opening. The mirror housing 22 has a substantially planar outer surface on the side wall 26 facing a vehicle side door 28.

Figure 2:
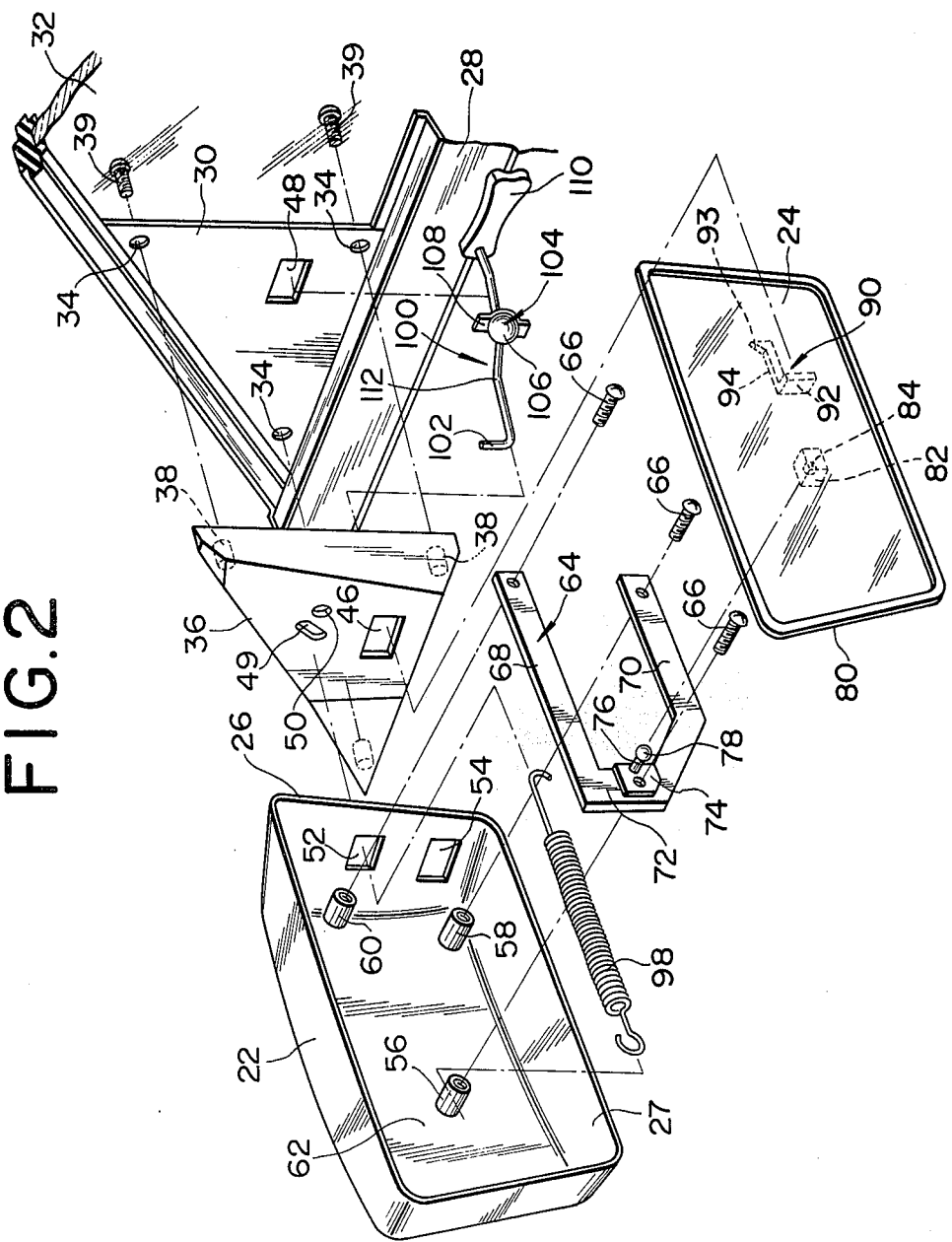
FIG. 2 is an exploded perspective view of the rear-view mirror arrangement of FIG. 1.

As shown in FIGS. 1 and 2, a corner piece 30 is mounted on the substantially triangular front end of the window 32 formed in the vehicle side door 28. The corner piece 30 is formed with a plurality of openings 34 adjacent each corner thereof. A mirror housing support 36 face the outer surface of the corner piece 30 and has a plurality of bosses 38 opposing the openings 34. The bosses 38 and the openings 34 are axially aligned and the mirror housing support 36 is mounted on the outer surface of the corner piece 30 and fixedly secured thereon by screws 39 engaged with the bosses 38. The mirror housing support 36 has a support plane 40 which is positioned apart from the outer surface of the corner piece so as to define therebetween a space 42. The support plane 40 of the mirror housing support 36 is formed with substantially rectangular opening 46. In horizontal alignment with the opening 46, the corner piece 30 is formed with a substantially rectangular opening 48. Also, the support plane 40 is formed with an elongated opening 49. A circular hole 50 is formed in the support plane 40 adjacent to the elongated opening 49. The mirror housing 22 is also formed with substantially rectangular openings 52 and 54 corresponding to the openings 49 and 46 in the support plane 40. The mirror housing 22 is mounted on the support plane 40 at the side wall 26 with alignment of the openings 52 and 54 with the openings 49 and 46 and with contacting in face to face relationship.

The mirror housing 22 is formed with a plurality of bosses 56, 58 and 60 protruding into the interior of the mirror housing from the inner surface of the front wall 62 thereof. On the free ends of the bosses 56, 58 and 60, a mirror support 64 is mounted and is fixedly secured thereon by the screws 66. Th mirror support 64 has substantially C-shaped configuration comprising upper and lower horizontal sections 68 and 70 and a vertical section 72 which is located between the upper and lower horizontal sections 68 and 70. On the rear surface of the vertical section 72, a member 74 with a protrusion 76 is secured by the screw 66. The protruding 76 has a ball-shaped head 78 at the free rear end thereof.

The mirror 24 is held by a mirror back member 80 which extends around the entire circumference thereof. On the front surface of the mirror back member 80, a member 82 with ball-shaped groove 84 is secured at a location in axial alignment with the protrusion 76. The ball-shaped head 78 of the protrusion 76 is engaged in the ball-shaped groove 84 so that they interact as a pivot for supporting the mirror 24 and the mirror back member 80 assembly and for permitting them to pivot in all directions. A screw 88 is threaded to the member 82, which screw 88 acts to reduce the diameter of the groove 84 and to restrict the ball-shaped head 78 from escaping therefrom.

It should be noted that, as seen from the drawings, the pivot 78,84 is formed at a location adjacent the outer end of the mirror 24. This facilitates the use of a streamline-shaped mirror housing 22.

Figure 4:
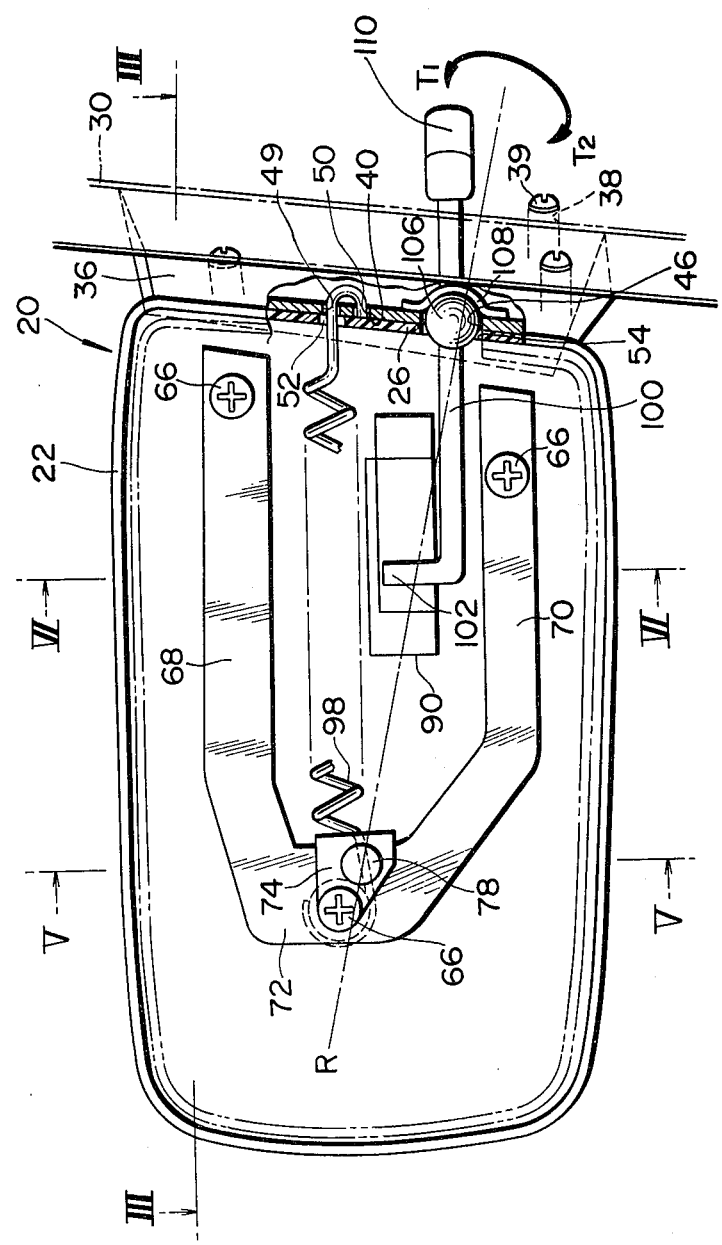
FIG. 4 is an enlarged front elevation of the rear-view mirror arrangement of FIG. 1.
Figure 5:
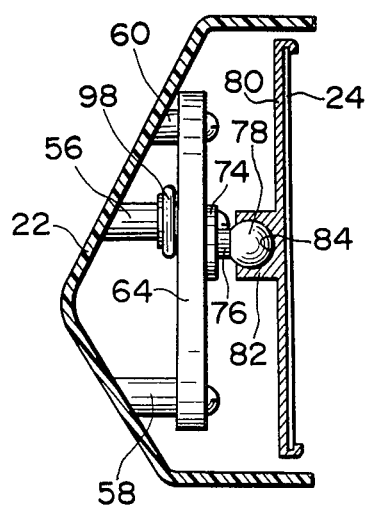
FIG. 5 is an enlarged cross-section of the rear-view mirror arrangement of FIG. 1 taken along line V—V of FIG. 4.
Figure 6:
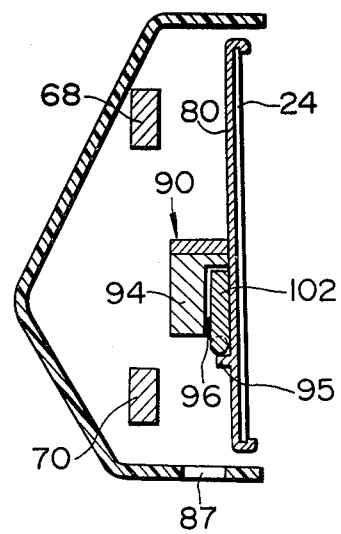
FIG. 6 is an enlarged cross-section of the rear-view mirror arrangement of FIG. 1 taken along line VI—VI of FIG. 4.
Figure 7:
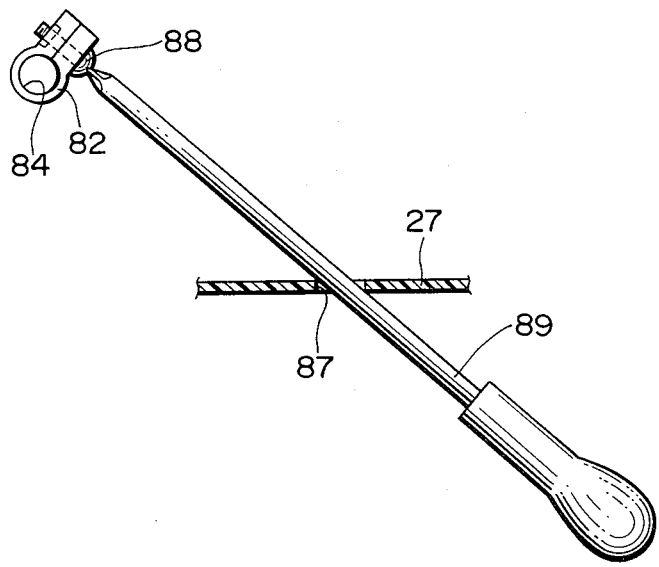
FIG. 7 is an explanatory illustration showing assembling operation of the pivot for adjustment of a mirror angle.

The mirror back member 80 is further secured to a member 90 which has a substantially L-shaped configuration in section. The member 90 comprises sections 92 and 94 integrally formed at a right angle. At the rear end of the section 92, the member 90 is secured onto the front surface of the mirror back 80 by means of a screw as shown in FIG. 4. On the other hand, the section 94 of the member 90 extends in parallel relationship with the front surface of the mirror back member 80 with space 96 therebetween. The section 94 has a tongue portion 93 frontwardly angled from the inner end of the section 94. Further, the mirror back member 80 is formed with a projection 95 at a location adjacent to the lower end of the section 94. The projection 95 serves as a stop for the downward motion of the adjustment lever which will be given a detailed explanation later. However, although the projection 95 is formed on the mirror back member 80 in the shown embodiment, it can be formed on the section 94.

It should be appreciated that the guide member 90 is not necessarily separated from the mirror back member 80 but can be formed integrally with the mirror back member 80. Also, the means for securing the guide member 90 can be replaced by any suitable means and further it is possible to bond the guide member onto the mirror back member 80.

Between the boss 56 and the support plane 40, a compression spring 98 is stretchably provided. The outer end of the spring 98 is engaged around the boss 56 and the hooked inner end passes through the rectanglar opening 52 of the mirror housing 22 and is engaged to the circular hole 50. Thus, the mirror housing 22 is urged against the support plane 40 of the mirror housing support 36 by the force of the spring 98 with the result that the outer surface of the side wall 26 is held flush against the support plane 40.

Although the inner end of the spring 98 is hooked to the support plane 40 in the shown embodiment, it is possible to engage the spring with the corner piece 30.

Through the rectangular openings 54, 46 and 48, respectively formed in the mirror housing 22, the mirror housing support 36 and the corner piece 30, an adjustment lever 100 passes to be connected with the member 90 on the mirror back member 80. As clearly shown in FIGS. 2 and 3, the outer end 102 of the adjustment lever 100 is bent upwardly and is placed within the space 96 formed between the mirror back member 80 and the section 94 of the member 90. A universal pivot 104 is provided on the adjustment lever 100 at the intermediate portion thereof. The universal pivot 104 comprises a ball member 106 which is placed within the space 42 defined between the corner piece 30 and the support plane 40 and which is fitted onto the adjustment lever 100. A fixture 108 rotatably secures the ball member 106 onto the mirror housing support 36. The adjustment lever 100 has a handle 110 at the inner end thereof where the adjustment lever 100 extends into the interior of the vehicle compartment. As clearly shown in FIG. 2, the adjustment lever 100 is angled at a portion 112 intermediate between the pivoted portion and the outer end 102 thereof. The angled portion 112 enables the adjustment lever 100 to effectively transmit the force applied to the handle 110 for adjustment of the mirror angle.

To assemble the side mirror on the vehicle, the corner piece 30 is mounted on the lower front corner of the window 32 of the vehicle side door 28. The mirror housing support 36 is mounted onto the outer surface of the corner piece 30 with alignment of the bosses and the openings 34 of the corner piece. The screws 39 are then passed through the openings 34 and engaged to the bosses 38 in order to secure the mirror housing support 36 onto the corner piece 30. On the support plane 40 of the mirror housing support 36, the outer surface of the side wall 26 of the mirror housing 22 is mounted in face to face relationship. At this time, a plurality of projections 41 formed on the support plane 40 engage with corresponding dents 25 formed on the outer surface of the side wall 26 for accurate positioning. In this position, the inner end of the spring 98, the outer end of which is engaged with the boss 56, passes through the elongated opening 44 and engages with the opening 50.

The spring 98 is thus stetched between the boss 56 and the support plane 40 and urges the outer surface of the side wall 26 onto the support plane 40 so that it can maintain the mirror housing on the mirror housing support 36 in a substantially laterally extending position with respect to the support plane.

The reflecting mirror 24 with its mirror back member 80 is then mounted in the mirror housing 22 by means of engagement between the ball-shaped head 78 of the protrusion 76 and the ball-shaped groove 84 of the member 82. The mirror 24 is thus universally rotatable with respect to the ball-shaped head 78. In this position, the member 82 is tightened by a screw 88 with a driver 89 inserted through an opening 87 formed in the bottom 27 of the mirror housing 22.

It will be seen that the opening 87 formed in the bottom 27 of the mirror housing 22 also serves as a drain for rain which enters into the mirror housing through the circumferential clearance between the mirror and the mirror housing.

The adjustment lever 100 is inserted into the miror housing 22 through the rectangular openings 48, 46 and 54. The handle 110 is positioned in the interior of the vehicle compartment so that it permits adjustment of the mirror angle from the inside of the vehicle. The outer end 102 of the adjustment lever 100 is then inserted into the space 96 defined by the mirror back member 80 and the member 90.

The ball member 106 fitted onto the adjustment lever 100 is mounted on the inner surface of the support plane 40 by a fixture 108. The ball member 106 thus permits universal pivoting motion of the adjustment lever 100.

Figure 3:
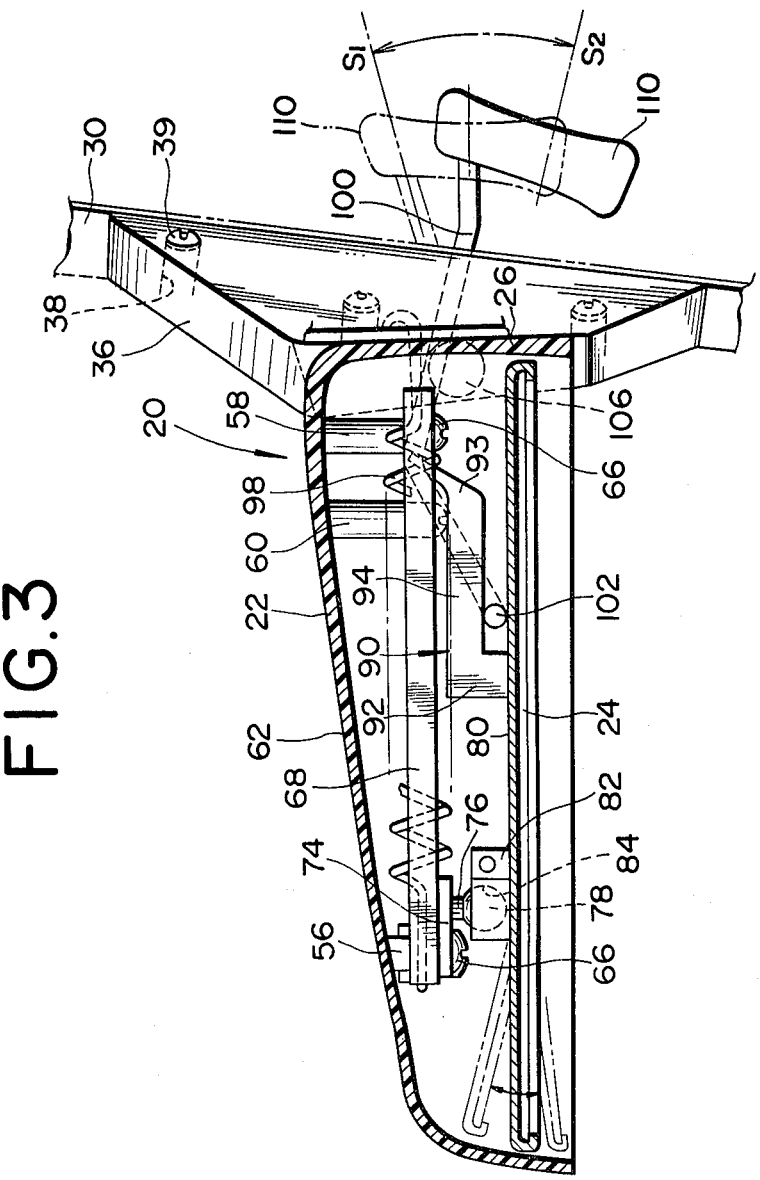
FIG. 3 is an enlarged sectional view of the rear-view mirror arrangement taken along line III—III of FIG. 4.

To adjust the mirror about its substantially vertical axis the handle 110 of the adjustment lever 100 is moved about the pivot 104 as shown in FIG. 3. If the handle 110 is moved as indicated by arrow $S_1$ in FIG. 3, the outer end 102 of the adjustment lever 100 is moved rearward and thus opposed portion of the mirror back member 80 with the mirror 24 rearwardly. Thus, the mirror 24 and the mirror back member 80 assembly is moved about the pivot 74, 78 and the mirror angle is adjusted. On the other hand, if the handle 110 of the adjustment lever 100 is moved toward the direction indicated by arrow $S_2$, the outer end 102 of the adjustment lever 100 moves frontwardly to urge the opposed portion of the mirror 24 and mirror back member 80 assembly frontwardly. Thereby, the mirror 24 is moved about the pivot 74, 78 and the mirror angle is adjusted.

To adjust the mirror about its substantially horizontal axis, the handle 110 of the adjustment lever 100 is rotated about the pivot 104. Assuming the handle 110 is rotated in the direction $T_1$ as shown in FIG. 4, the outer end 102 of the adjustment lever 100 is rotated in the corresponding direction and thus urges the mirror 24 to rotate in the same direction and at the same angle. Thus, the mirror 24 is rotated about a rotational axis R defined by the pivots 74, 78 and 104. When the handle 110 is rotated in the direction $T_2$, the mirror 24 is rotated in the counter direction about the axis R.

Figure 8:
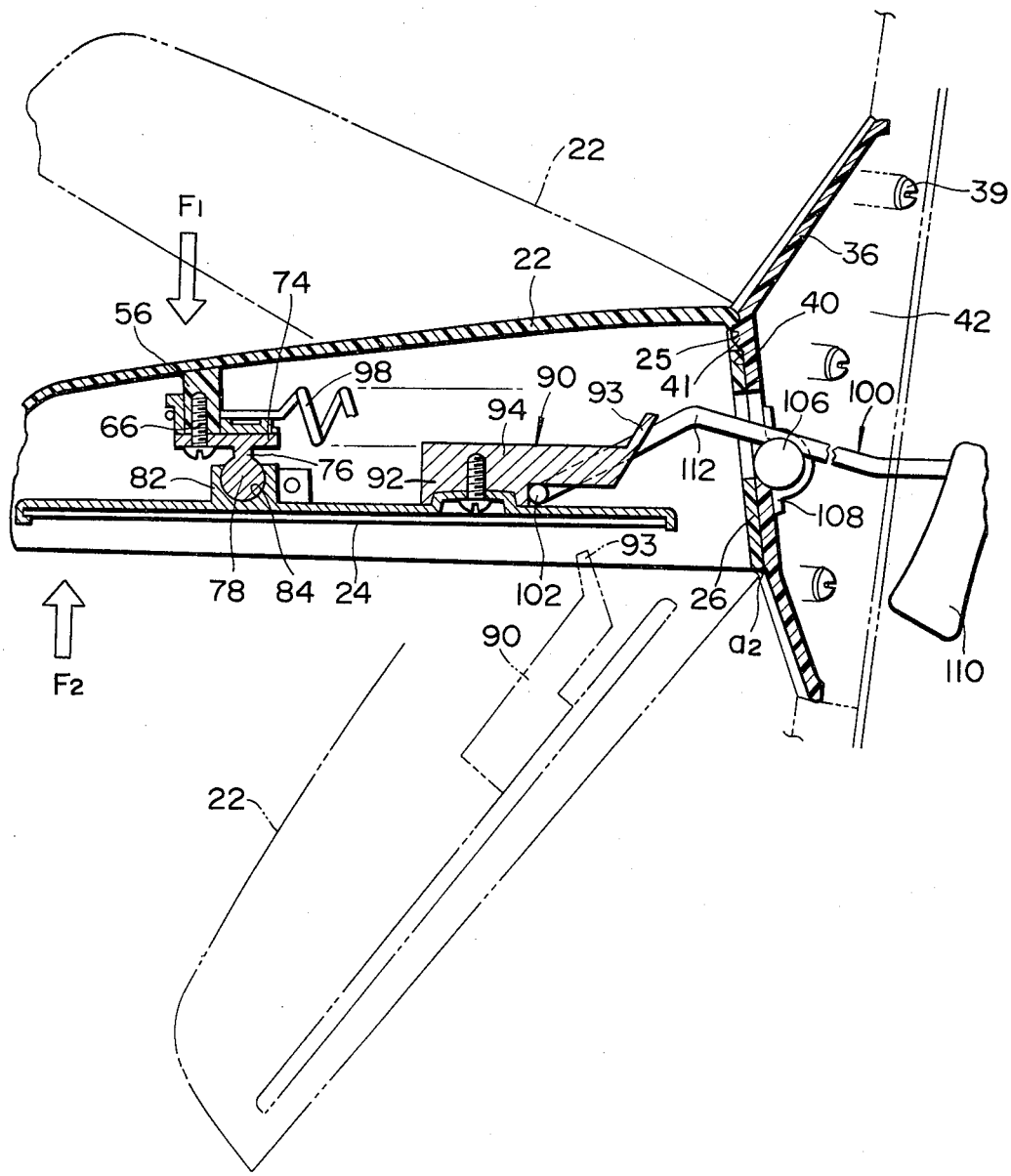
FIG. 8 is a similar view to FIG. 3 but illustrates a horizontal impact applied to the mirror housing.

If an impact $F_1$ is applied to the mirror housing 22, as shown in FIG. 8, by colliding against something by accident for example, the mirror housing 22 is displaced from the support plate 40 of the mirror housing support 36 against the retaining force provided by the spring 98. At this time, the contact line $a_2$ in FIG. 8, between rear end of the side wall 26 of the mirror housing 22 and the adjacent support plane 40 of the mirror housing support 36 serves as a rotational axis of the mirror housing displacement. Thus, the mirror housing 22 is inclined about the axis $a_2$ in response to the impact $F_1$ for absorbing the shock of the collision. At this moment, the outer end 102 of the adjustment lever 100 engaging with the guide member 90 permits the mirror housing displacement by permitting the guide member 90 to move therealong. The outer end 102 is finally disengaged from the guide member 90 by the rotational displacement of the mirror housing relative to the support plane 40 of the mirror housing support 36, as shown by chain line in FIG. 8. On the other hand, by expansion corresponding to the mirror housing displacement, the spring 98 accumulates the spring force.

When the impact $F_1$ is removed, the mirror housing 22 is returned to its original position by the accumulated spring force of spring 98. At this time, the outer end 102 of the adjustment lever 100 and guide member 90 are smoothly engaged to return their original position by the function of the tongue portion 93 of the guide member 90. Likewise, in response to an impact $F_2$ applied to the mirror housing from the rear side of the vehicle, the mirror housing 22 is similarly displaced in the opposite direction.

Figure 9:
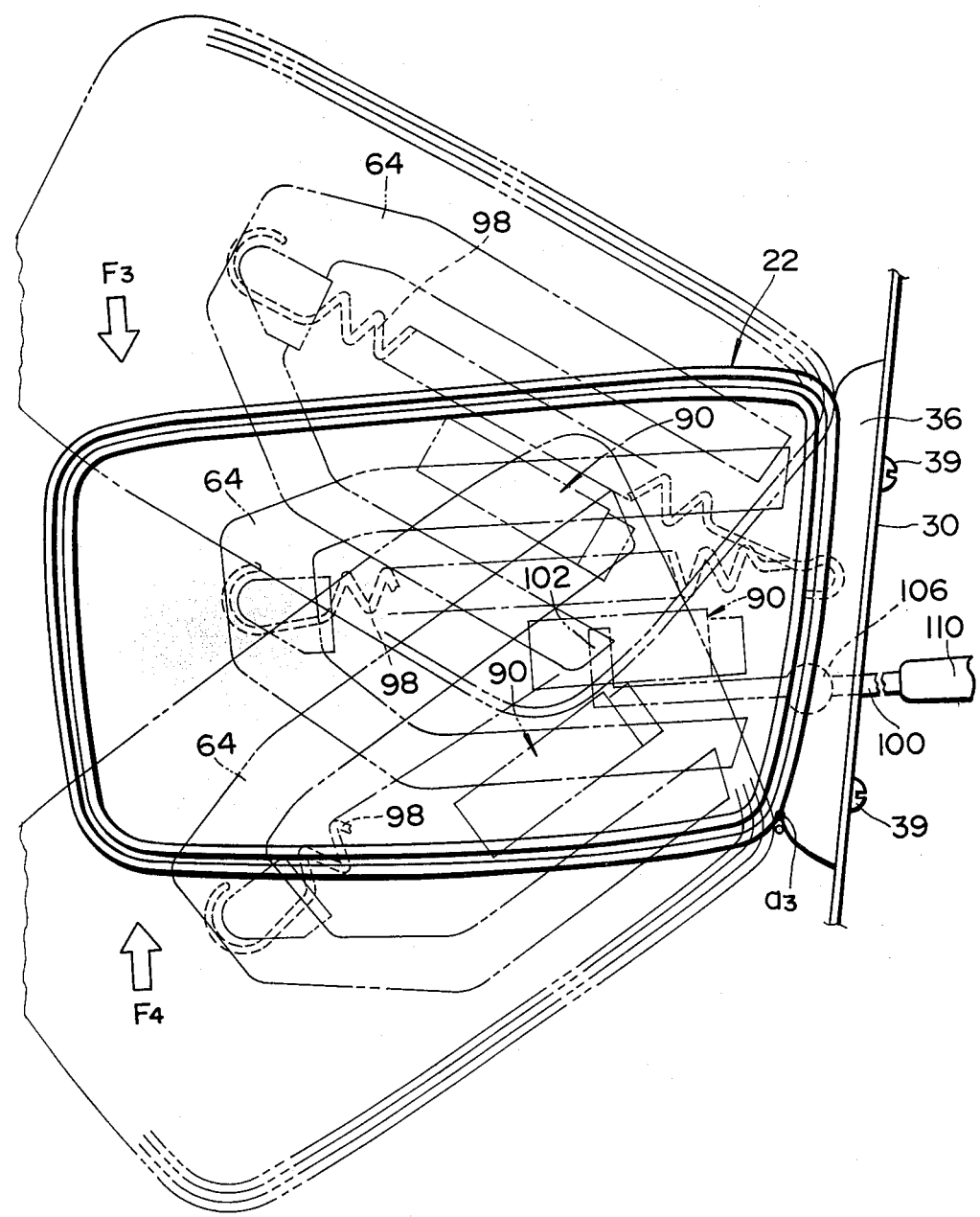
FIG. 9 is a similar view to FIG. 5 but illustrates the effect of a vertical impact applied to the mirror housing.

When a vertical impact $F_3$ is applied to the mirror housing 22 as shown in FIG. 9, the mirror housing 22 is moved about an axis $a_3$ defined between the support plane 40 of the mirror housing support 36 and the side wall 26, which axis $a_3$ is shown in FIG. 9. At this time, the guide member 90 and the outer end 102 of the adjustment lever 100 are disengaged permitting displacement of the mirror housing 22 about the support plane 40. The spring 98 is thus expanded to accumulate the force thereof. Similar to the foregoing, after the impact $F_3$ is removed, the mirror housing 22 is returned to its original position by the accumulated spring force. In response to an impact $F_4$ applied to the mirror housing 22 upwardly, as shown in FIG. 9, the housing will be similarly displaced in the upward direction.

Figure 10:
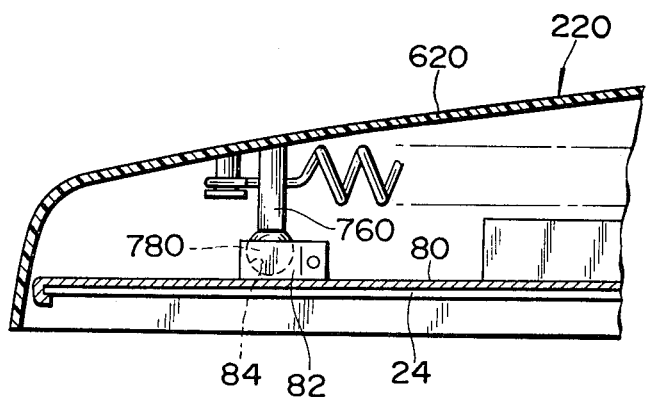
FIG. 10 is a partial section showing a modification of the mirror housing and the mounting of the mirror and mirror back member onto the mirror housing.
Figure 11:
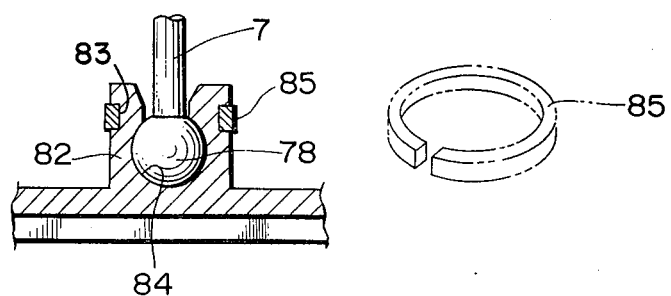
FIG. 11 is an enlarged partial illustration showing of a further modification the engagement of the head of the protrusion in a member having a bowl shaped groove comprising the pivot for mirror angle adjustment.

Although the present invention is illustrated in detail by the specific embodiment shown in FIGS. 1-9, the present invention can be embodied otherwise in various constructions and elements. For example, FIG. 10 shows a modification of the mirror housing. In this modification, the mirror housing 220 is formed of aluminum or the like having sufficient rigidity and elasticity. The mirror housing 220 is made by die casting and has a protrusion 760 having a ball-shaped head 780 protruding from the front wall 620. Since the mirror housing 220 per se has sufficient rigidity for supporting the mirror 24 and mirror back member 80, the mirror support in the foregoing embodiment is no longer necessary. Further, a modification of the construction for restricting the ball member 80 from escaping from the ball-shaped groove 84 is shown in FIG. 11. In this modification, the member 82 having the ball-shaped groove 84 is formed with an annular groove 83 on the outer periphery thereof. An elastic snap ring 85 is seated in groove 83 for tightening the engagement between the ball-shaped groove 84 and the head 78 of the protrusion 76. Therefore, the present invention should be understood to include all of the modifications suggested or made obvious by the foregoing disclosure.

What is claimed is:

1. A rear view mirror arrangement for an automotive vehicle, which is mounted on the vehicle side door, comprising:
    a reflecting mirror;
    a mirror housing having a first pivot means for pivotably supporting said mirror therewithin;
    a mirror angle adjustment lever having an operating handle at the inner end thereof, said handle being positioned inside of the vehicle passenger compartment, said lever having an outer end cooperatively and releasably connected to said mirror, and said lever having a second pivot means provided at the intermediate portion of said adjustment lever for permitting said adjustment lever to move in any direction; and
    a spring provided between said mirror housing and the vehicle side door for elastically urging said mirror housing against the vehicle side door in order to retain said mirror housing in the laterally protruded position.

2. A rear view mirror arrangement mounted on a side door of an automotive vehicle comprising:
    a reflecting mirror for showing a rear view;
    a mirror housing for supporting said mirror therein, said mirror housing having a plane surface at the portion facing the side door;
    a first pivot means positioned between and connecting said reflecting mirror and said mirror housing permitting universal movement of said mirror about said first pivot means for adjustment of the mirror angle;
    a spring positioned between and connecting said mirror housing and the side door for providing compression force in order to elastically retain said mirror housing onto the vehicle side door with face to face contact between said plane surface of said mirror housing and the side door;
    a mirror angle adjustment lever having an operating handle at the inner end thereof located within the vehicle passenger compartment, said mirror angle adjustment lever being releasably connected to said mirror at the outer end thereof in order to transmit an operational force applied to said handle to said mirror to adjust the mirror angle; and
    a second pivot means pivotably connecting said mirror angle adjustment lever to the vehicle side door, said second pivot means permitting the mirror angle adjustment lever to move in any direction.

3. A rear view mirror arrangement as set forth in claims 1 or 2, wherein said first pivot means comprises a first member protruding from said mirror housing and having a ball-shaped head at the free end thereof and a second member formed with a ball-shaped groove for receiving said ball-shaped head.

4. A rear view mirror arrangement as set forth in claim 3, wherein said mirror housing has a mirror support in its interior, said first member of said first pivot means protruding from said mirror support.

5. A rear view mirror arrangement as set forth in claim 4, wherein said second member of said first pivot means is provided with means for restricting said ball-shaped head of said first member from escaping therefrom.

6. A rear view mirror arrangement as set forth in claim 5, wherein said restricting means provided on said second member of said first pivot means is a screw for tightening said second member thereby reducing the diameter of said ball-shaped groove preventing escape of said ball-shaped head placed therein.

7. A rear view mirror arrangement as set forth in claim 5, wherein said restricting means is a snap ring elastically engaged within an annular groove formed on the outer periphery of said second member of said first pivot means.

8. A rear view mirror arrangement as set forth in claim 2, wherein said arrangement further comprises a mirror housing support mounted on the vehicle side door, said mirror housing support having a support plane facing said plane surface of said mirror housing.

9. A rear view mirror arrangement as set forth in claim 8, wherein said mirror housing support is formed with a pair of openings for receiving and retaining the inner end of said spring, said spring being connected to said mirror housing at the outer end of said spring by engaging with a projection formed within the interior of said mirror housing.

10. A rear view mirror arrangement as set forth in claim 9, wherein said mirror housing is urged onto said support plane of said mirror housing support with face to face contact therebetween, each of the peripheral edges of said plane surface of said mirror housing acting as a rotational axis when said mirror housing displaces from said support plane against the spring force in response to an impact accidentally applied to said mirror housing.

11. A rear view mirror arrangement as set forth in claims 1 or 2, further having a guide member secured on the back of said mirror, said guide member permitting the outer end of said mirror angle adjustment lever to escape therefrom when said mirror housing is displaced from the vehicle side door in response to an impact applied thereto.

12. A review view mirror arrangement as set forth in claim 11, wherein said mirror angle adjustment lever is angled at the portion between said second pivot means and the outer end, said angled portion effectively transmitting the operational force for mirror angle adjustment to said mirror through said guide member.

13. A method for mounting a rear view mirror onto a side door of an automotive vehicle comprising:
    forming a support plane on the vehicle side door for mounting a mirror housing thereon;
    mounting said mirror housing onto said support plane with face to face contact;
    elastically urging said mirror housing onto said support plane so that said mirror housing is normally retained in a position laterally protruding from said support plane of the vehicle side door;
    releasably connecting a mirror angle adjustment lever to a reflecting mirror so that said mirror angle adjustment lever protrudes into the interior of a vehicle passenger compartment at the inner end thereof for mirror angle adjustment operation within the passenger compartment; and
    securing said mirror angle adjustment lever onto the vehicle side door in a position such that said mirror angle adjustment lever is movable in any direction;
    whereby said mirror housing is normally retained on said support plane formed on the vehicle side door and is temporarily displaced from said support plane in response to an impact applied to said mirror housing from any direction in order to absorb the impact.

14. A method as set forth in claim 13, said method further comprising mounting said mirror within said mirror housing on a pivot permitting said mirror to be rotated in any direction.

15. A method as set forth in claims 13 or 14, said method further comprising positioning a compression spring between the vehicle side door and said mirror housing so that said spring supplies a force to said mirror housing urging it against said support plane of the vehicle side door, said spring accumulating a spring force when said mirror housing is displaced from its normal position in response to an impact applied to said mirror housing, said accumulated spring force returning said mirror housing to its normal position.

16. A rear view mirror arrangement for an automotive vehicle, which is mounted on a surface of the vehicle side door, comprising:
    a reflecting mirror;
    a mirror housing having a first pivot means for pivotably supporting said mirror;
    a mirror angle adjustment lever having an operating handle at the inner end thereof, said lever handle being positioned inside of the vehicle passenger compartment, said lever having an outer end cooperatively and releasably connected to said mirror;
    second pivot means provided on the intermediate portion of said adjustment lever for permitting said adjustment lever to pivot in any direction with relation to the surface of the vehicle side door; and
    a spring provided between said mirror housing and the vehicle side door for elastically urging said mirror housing against the vehicle side door in order to retain said mirror housing in the laterally protruded position, said spring permitting said mirror housing to displace from the vehicle side door surface in response to an impact applied to said mirror housing in any direction.

* * * * *